United States Patent
Kulidjian et al.

(10) Patent No.: US 7,318,002 B2
(45) Date of Patent: Jan. 8, 2008

(54) METHOD AND APPARATUS FOR AUTOMATED TESTING OF DISPLAY SIGNALS

(75) Inventors: Ara Kulidjian, North York (CA); Andrej Zdravkovic, North York (CA)

(73) Assignee: ATI Technologies Inc., Markham, Ontario (CA)

( * ) Notice: Subject to any disclaimer, the term of this patent is extended or adjusted under 35 U.S.C. 154(b) by 0 days.

(21) Appl. No.: 10/674,190

(22) Filed: Sep. 29, 2003

(65) Prior Publication Data
US 2005/0071108 A1    Mar. 31, 2005

(51) Int. Cl.
*G01R 27/28*    (2006.01)

(52) U.S. Cl. .................................. 702/117; 702/66
(58) Field of Classification Search ............. 702/66, 702/117; 348/181, 182; 714/25, 40, 45, 714/30
See application file for complete search history.

(56) References Cited

U.S. PATENT DOCUMENTS

| | | | |
|---|---|---|---|
| 5,740,352 A * | 4/1998 | Philipp et al. ................ 714/40 |
| 6,323,828 B1 * | 11/2001 | Perez ............................ 345/10 |
| 6,924,796 B1 * | 8/2005 | Someya et al. ............. 345/213 |
| 7,009,604 B2 * | 3/2006 | Chan et al. ................. 345/213 |

* cited by examiner

*Primary Examiner*—John Barlow
*Assistant Examiner*—Stephen J Cherry
(74) *Attorney, Agent, or Firm*—Vedder, Price, Kaufman & Kammholz P.C.

(57) ABSTRACT

A method and apparatus for automated testing of display signals from video graphics circuitry includes capturing display signals that are provided from a processing device to the display device. The method and apparatus further includes converting the display signals into data acquisition signals, where a data acquisition signal includes a converted display signal having the display information contained therein wherein the data acquisition signal is in a form capable of being directly analyzed by a testing system. Furthermore, the method and apparatus includes providing the data acquisition signals to a test system that tests the display signals.

18 Claims, 3 Drawing Sheets

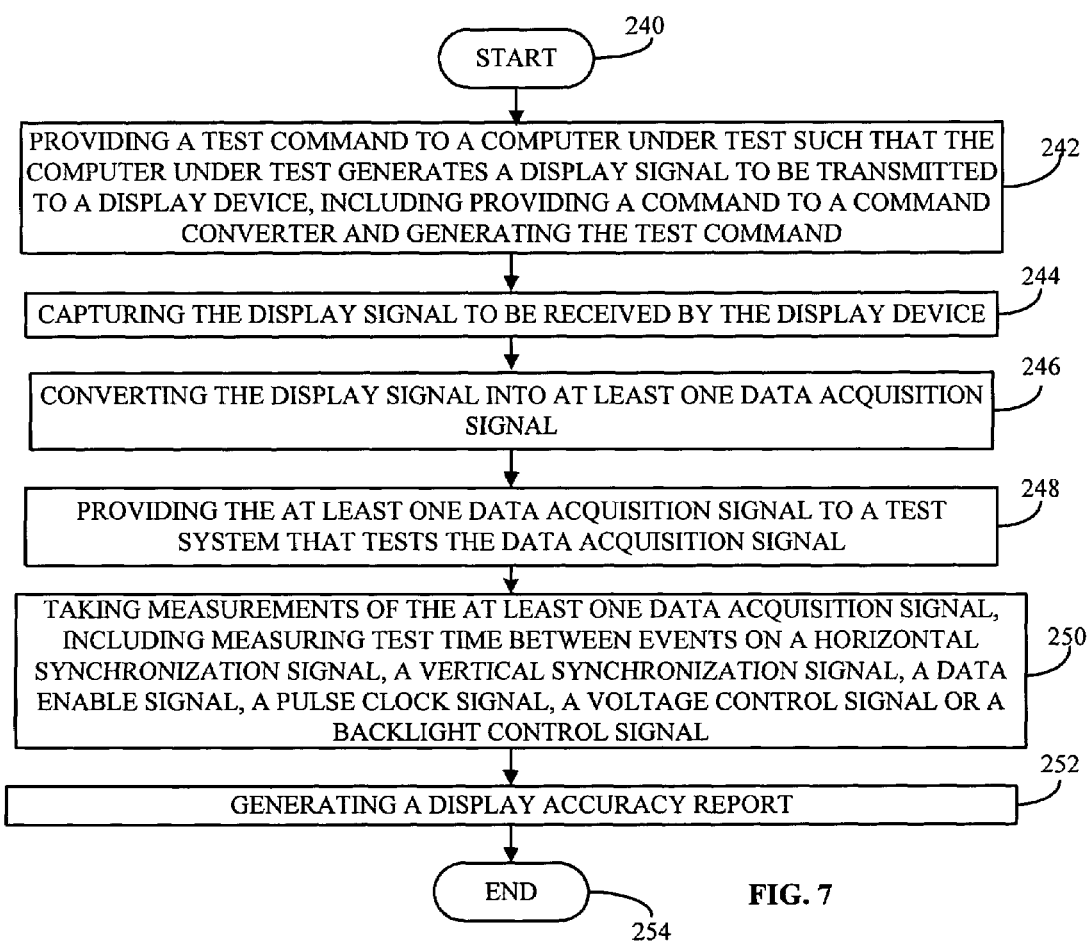

METHOD AND APPARATUS FOR AUTOMATED TESTING OF DISPLAY SIGNALS

FIELD OF THE INVENTION

The present invention relates generally to testing of video graphics systems and more specifically to the automated testing of the electrical signals produced by video graphics circuitry and software representing image pixel information for display on a video display device.

BACKGROUND OF THE INVENTION

Video graphics circuitry is used in a plurality of applications such as computers, video games, and televisions. Such video graphics circuits process images for subsequent display.

In a typical computer system, at least one video display device is coupled to a main processing system and at least one input device either directly or through the main processing system. The display device includes, but is not limited to, a cathode ray tube (CRT), a liquid crystal display (LCD), a flat panel display, an analog RGB monitor or any other suitable output device to provide a visual output. The main processing system typically includes at least one microprocessor coupled to at least one memory device or any other suitable system for controlling the input devices, operating executable instructions, such as an operating system, and controlling the output devices, as recognized by one having ordinary skill in the art.

In order to better ensure the quality and effectiveness of the video graphics circuitry, it is desirable to measure the display signals that are provided to the display device. The display signals include any signal provided to a display, such as, but not limited to, a data enable signal, a vertical synchronization signal, a horizontal synchronization signal, a voltage control signal, a backlight control signal, or any other suitable signal directed to the operation or display of a display device. To effectively measure these incoming signals, a technician is required to physically tie into the transmission circuitry used to transmit the display signals to the display device and test these raw signals. One effective way to test the different display signals is to input specific instructions on a keyboard or other input device and then measure various characteristics and interrelationships of the extracted display signals using an oscilloscope.

Thus, in order to test a display device, a technician must dedicate much time and manual effort to specifically extracting the required signals and then performing a multitude of tests on an oscilloscope. This process is extremely time consuming, and may be unreliable due to technician error or inaccuracies in interpreting the oscilloscope output. Also, this process requires further manual manipulation of extracted data to generate a test report, thus requiring further time and also allowing for the further possibility of technician error.

Furthermore, with the different types of available display signal transmission techniques, such as, but not limited to, low voltage differential signaling (LVDS) and transition minimized differential signaling (TMDS), different techniques must be utilized to extract the relevant signals and to further be able to measure the signals using an oscilloscope. This problem also exists based on different types of display, such that different displays utilize different display signal formats, which adds further complication for a technician to extract and measure the display signal using an oscilloscope. Not only does this add further time constraints for a technician, but also increases the likelihood of human error within the testing of the display signals.

As such, a need exists for quickly and efficiently extracting and measuring display signals provided to the display device.

BRIEF DESCRIPTION OF THE DRAWINGS

The invention will be more readily understood with reference to the following drawings wherein:

FIG. 6 illustrates a flowchart of the steps of the method for automated testing of display signals, in accordance with one embodiment of the present invention; and FIG. 7 illustrates a flowchart of the steps of the method for automated testing of display signals, in accordance with one embodiment of the present invention.

DETAILED DESCRIPTION OF A PREFERRED EMBODIMENT OF THE INVENTION

Briefly, a method and apparatus for automated testing of display signals provided by a video processing device, such as a main processor, an intermediate processor, or any other suitable processor capable of receiving input commands and thereupon providing signals to a display device, includes intercepting, capturing and analyzing the display signals intended for the display device. The method and apparatus further includes converting the display signals into data acquisition signals, where a data acquisition signal includes a converted display signal having the display information contained therein, wherein the data acquisition signal is in a form capable of being directly analyzed by a testing system. Furthermore, the method and apparatus includes providing the data acquisition signals to a test system that tests the display signals. In one embodiment, the test system includes a test computer with a data acquisition subsystem. The data acquisition subsystem receives one or more electrical signals and analyzes signal events, such as a change of the voltage of a signal above or below a predefined threshold. The data acquisition subsystem is capable of taking various measurements of electrical signals, including but not limited to measuring the voltage of a signal at a specific moment in time, the time interval between any two events on any received signal, and the total number of events between two other events. Furthermore, the test computer has a memory storing executable instructions wherein when the test computer processor executes the executable instructions, the data acquisition signals are analyzed.

Figure 1:
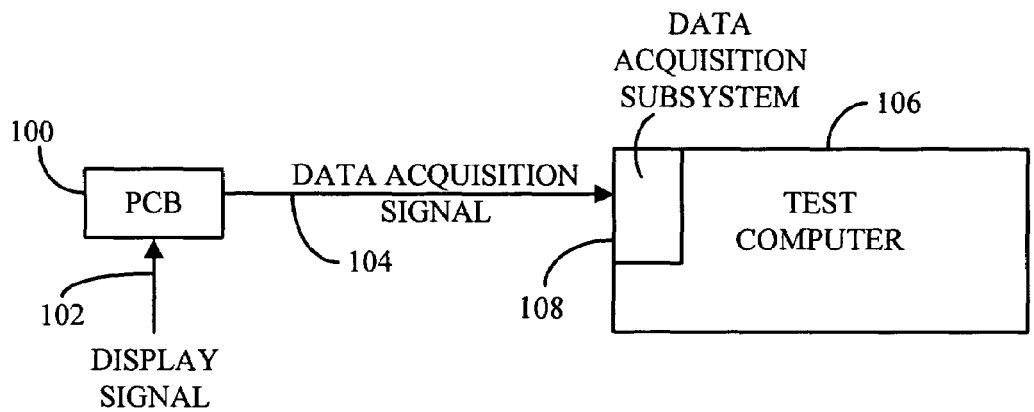
FIG. 1 illustrates in block diagram form an apparatus for testing display signals, in accordance with one embodiment of the present invention.

More specifically, FIG. 1 illustrates one embodiment of the present invention, including a printed circuit board 100 that receives one or more display signals 102. In one embodiment of the present invention, display signals 102 that are to be provided to a display are instead provided to the printed circuit board 100. In another embodiment, the display signals 102 are intercepted from a transmission path directed to a display and also provided to the printed circuit board 100.

The printed circuit board 100 thereupon generates data acquisition signals 104 by converting display signals 102, as discussed below with reference to FIGS. 3-5 in different embodiments of the present invention. Data acquisition signals 104 are thus provided to a test computer 106, more specifically, a data acquisition subsystem 108 of the test computer 106. The test computer 106 receives the data acquisition signals 104 and tests the data acquisition signals 104, as discussed below.

Tests on the data acquisition signals 104 include, but are not limited to, making a measurement, such as a time interval measurement, and testing that the measurement is within the allowed tolerance of the display device input signal specifications. Examples of time interval measurements include, but are not limited to: pulse width, which can be defined as the time interval that a signal remains in a specific logic state; period, which can be defined as the time interval that a signal remains in a specific logic state plus the ensuing complementary logic state; and phase, which can be defined as the time interval between a logic state transition of one signal to a logic state transition of another signal.

Figure 2:
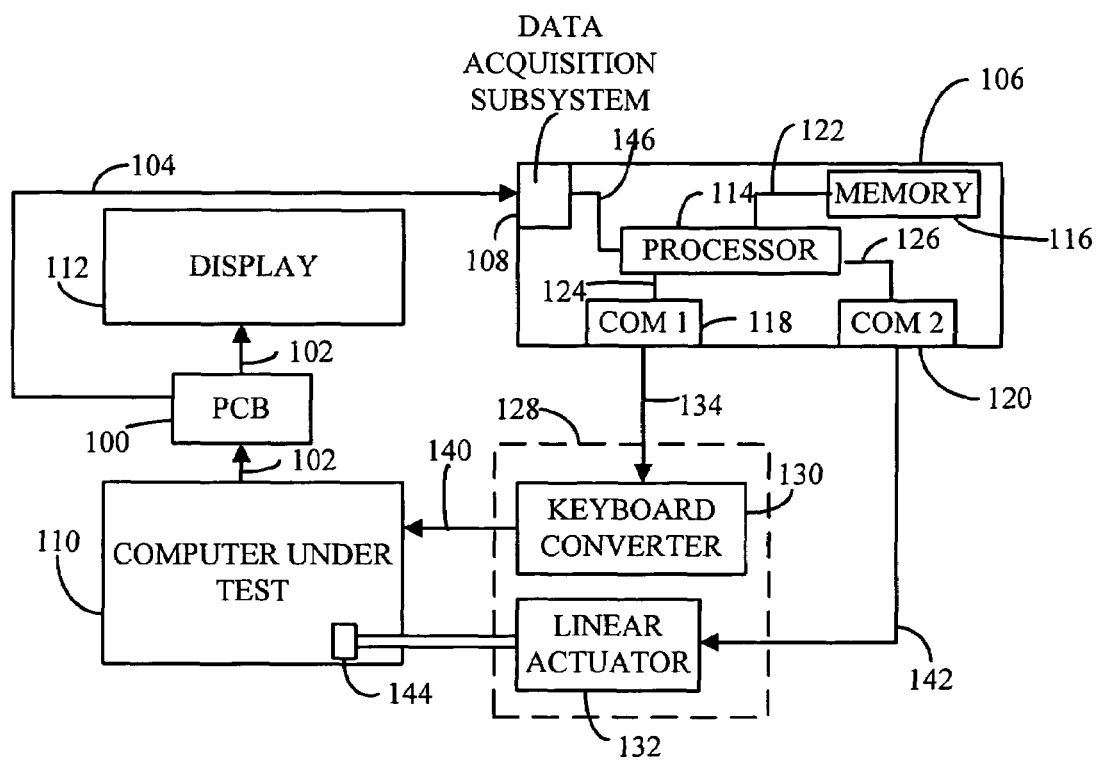
FIG. 2 illustrates the apparatus of FIG. 1 further including a computer under test, in accordance with one embodiment of the present invention.

FIG. 2 illustrates the automated display signal testing device of FIG. 1 with respect to a computer under test 110, which may be any suitable computing device which receives a user input and provides display signals 102 to a display 112. For illustration purposes only, in one example of the computer under test 110 is a mobile computer and the display 112 is an LCD, the display signal 102 may be transmitted to the LCD display using LVDS.

The test computer 106 further includes a processor 114, a memory 116 having executable instructions stored therein, a first communication port 118 and a second communication port 120. As recognized by one having ordinary skill in the art, many elements within the test computer 106 have been omitted for clarity purposes only. The processor 114 may be, but not limited to, a single processor, a plurality of processors, a DSP, a microprocessor, ASIC, state machine, or any other implementation capable of processing and executing software. The term processor should not be construed to refer exclusively to hardware capable of executing software, and may implicitly include DSP hardware, ROM for storing software, RAM, and any other volatile or non-volatile storage medium. The memory 116 may be, but not limited to, a single memory, a plurality of memory locations, shared memory, CD, DVD, ROM, RAM, EEPROM, optical storage, micro-code, or any other non-volatile storage capable of storing digital data for use by the processor 114.

The processor 114, in response to executable instructions 122 stored within the memory 116, generates a plurality of commands 124 and 126, which are provided to the first communication port 118 and 120, respectively. The first communication port 118 and the second communication port 120 are coupled to a command converter 128. In one embodiment of the present invention, the command converter 128 includes a keyboard converter 130 and a linear actuator 132. The keyboard converter 130 receives a command 134 and converts this command into a keyboard command 140 to be provided to the computer under test 110.

In one embodiment, the keyboard command 140 is a user-based command that is typically entered using a keyboard, keypad or a hot-key combination, which includes a combination or series of multiple key-strokes, such as <SHIFT>, <ALT> and another key. An example of a keyboard converter is VIP-335, sold by Vetra Systems Corporation, 275-J Marcus Blvd., Hauppauge, N.Y., USA, 11787. The keyboard converter 130 thereupon generates a simulated key-stroke command 140 that is provided to the computer under test 110. In one embodiment, the computer under test 110 receives the key-stroke command 140 at a keyboard port (not shown) which causes the computer under test 110 to thereupon generate corresponding display signals.

The linear actuator 132 receives a power command 142 from the second communication port 120 and thereupon displaces an actuator tip 144, which emulates a user depressing a power toggle switch, such as an ON/OFF radial button or a sleep mode button on a keyboard or keypad associated with the computer under test 110. As recognized by one having ordinary skill in the art, the power command 142 may be provided to any other suitable conversion device, such as a power toggle switch, which provides for the adjustment of power to the computer under test 102, which thereupon generates display signals 102 containing power information, such as a backlight control signal that instructs the display 112 to turn on or off the LCD backlight.

The computer under test 110 thereupon provides the display signals 102 to the display 112 in response to either the key-stroke command 140 or a power state adjustment through the linear actuator 132. The printed circuit board 100 also receives display signals 102 and converts the display signals 102 into data acquisition signals 104 to be provided to the data acquisition subsystem 108 of the test computer 106. The data acquisition subsystem 108 thereupon takes measurements of the data acquisition signals 102 and provides the measurements 146 to the processor 114 such that the processor 114 may thereupon store the measurements 146 into memory 106.

The processor 114 works in combination with the commands 124 and 126 and the data signals 146 such that the processor 114 requests a specific modality of display signals 102 from the computer under test 110 through providing an explicit command, such as 124 or 126, to the computer under test 110. For example, if the command 126 is a power command, the processor 114 takes measurements of those data acquisition signals 104 that relate to powering the display on or off, such as the data enable, backlight, and power control signals. In another example, if the command 124 is a key-stroke command to change the resolution of the image to be displayed on display 112, the processor 114 takes measurements of those data acquisition signals 104 that relate to the displayed image, such as pixel color data signals, and data enable, horizontal synchronization, vertical synchronization, and pixel clock control signals.

Figure 3:
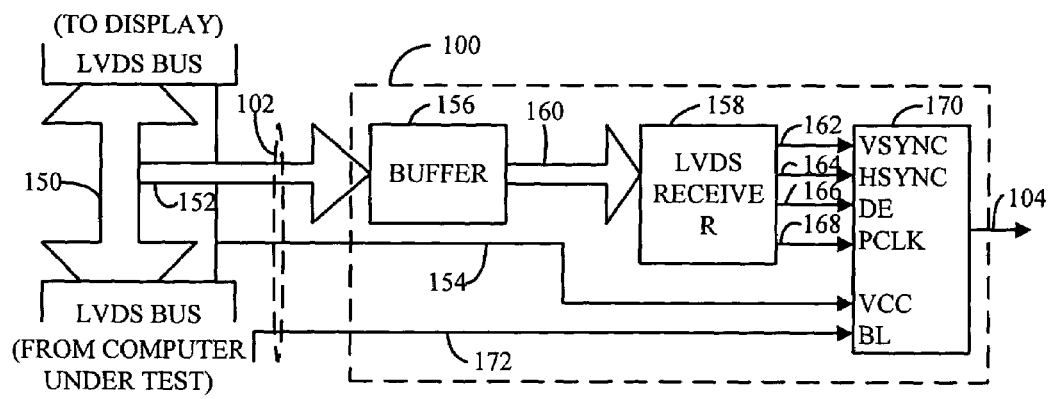
FIG. 3 illustrates a block diagram of a printed circuit board for testing the display signals to an LVDS type display in accordance with one embodiment of the present invention.

FIG. 3 illustrates one embodiment of the printed circuit board 100 for use with display signals 102 having a LVDS format. An LVDS bus 150 is provided between the computer under test, 110 in FIG. 2, and the display, 112 in FIG. 2. From the LVDS bus 150, LVDS signals 152 are extracted. In one embodiment, the LVDS signals 152 are extracted by the direct attachment of electrical leads to the LVDS bus 150. Further extracted from LVDS bus are a voltage control signal 154 and a backlight control signal 172 which are provided to the display, 112 in FIG. 2.

The LVDS signals 152 are provided to LVDS buffers 156 that are coupled to an LVDS receiver 158 such that buffered signals 160 are provided to the LVDS receiver 158. The LVDS receiver thereupon decodes the buffered signals 160 into a plurality of individual signals, in accordance with known LVDS receiver technology. The LVDS receiver 158 decodes the buffered signals 160 into a vertical synchronization signal 162, a horizontal synchronization signal 164, a data enable signal 166, and a pixel clock signal 168. These signals, 162, 164, 166 and 168, are thereupon provided to interface 170.

Interface 170 also receives the display voltage control signal 154 and the backlight control signal 172 also provided from the computer under test, 110 of FIG. 2. As discussed above, the backlight signal is directed to activating the lighting of the display 112, such as when the display 112 enters an inactive mode, otherwise known as sleep mode, and powers down the backlighting of the display to converse power. The combination of the LVDS signal, the voltage control signal 154 and the backlight control signal 172 represent the previously illustrated display signals 102 in the present embodiment.

The interface 170 represents the previously illustrated data acquisition signals 104. In one embodiment, the data acquisition signals 104 are the received signals, such as 154, 162, 164, 166, 168 and 172, to be provided to the test computer, 106 of FIG. 2. As recognized by one having ordinary skill in the art, any other suitable formatting of the data acquisition signal 104, such that the extracted display information may be provided to the computer under test, 106 of FIG. 2, may be utilized.

Figure 4:
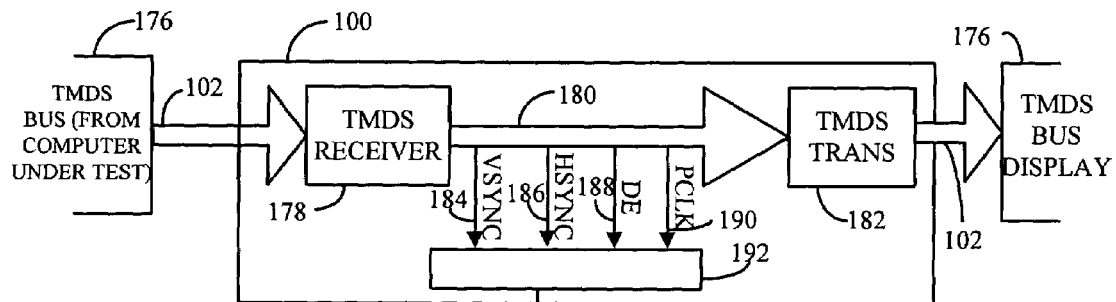
FIG. 4 illustrates a block diagram of a printed circuit board for testing the display signals to a TMDS type display in accordance with one embodiment of the present invention.

In another embodiment, FIG. 4 illustrates the printed circuit board 100 with respect to TMDS circuitry. A TMDS bus 176 provides the display signal 102 which has been formatted within the TMDS formatting and provided from the computer under test, 110 of FIG. 2, using a TMDS transmitter (not shown). The printed circuit board 100 intercepts the display signals 102 and provides these display signals to a TMDS receiver 178. The TMDS receiver 178 receives and decodes the display signals 102 in accordance with known TMDS receiver technology. The TMDS receiver thereupon generates TMDS signals 180 which are provided to a TMDS transmitter 182. The TMDS transmitter encodes and transmits the TMDS signals 180 in accordance with known TMDS transmitter technology, thereupon regenerating the display signals 102 which are provided back to the TMDS bus 176. The display signals 102 are thereupon provided to the display, 112 of FIG. 2.

The printed circuit board 100 utilizes the TMDS signals 180 by extracting different embedded signals. A vertical synchronization signal 184, a horizontal synchronization signal 186, a data enable signal 188 and pixel clock signal 190 are extracted from the TMDS signals 180 and provided to an interface 192. The interface 192 represents the previously illustrated data acquisition signals 104.

Figure 5:
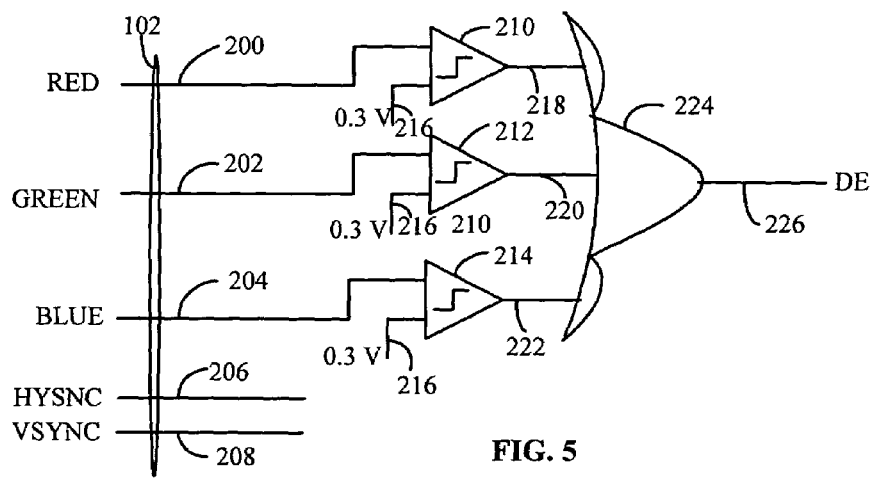
FIG. 5 illustrates a block diagram of a printed circuit board for testing the display signals to an analog RGB type display in accordance with one embodiment of the present invention.

FIG. 5 illustrates another embodiment of the printed circuit board 100 as with respect to an analog display device, such as an analog RGB monitor. From the display signals 102, a red signal 200, a green signal 202 and a blue signal 204 are extracted. Also included with the analog display signals 102 are a horizontal synchronization signal 206 and a vertical synchronization signal 208.

The red 200, blue 202 and green 204 signals are provided to voltage comparator functions 210, 212 and 214 respectively. Functions 210, 212 and 214 convert analog color signals 200, 202 and 204, to digital color signals 218, 220 and 222, respectively, by comparing the input signal to a voltage reference at 0.3 V, which is approximately half of the full scale voltage of the analog signal.

The three input OR gate 224 receives all three inputs 218, 220 and 222 and thereupon generates a signal 226, which can be used to represent a data enable signal. In the event at least one of the enable signals 218, 220 or 222 are enabled, the data enable signal 226 shall also be enabled. Thereupon, the horizontal synchronization signal 206, vertical synchronization signal 208, the digital red signal 218, the digital blue signal 220, the digital green signal 222, and the data enable signal 226 comprise the data acquisition signals and are provided to the test computer, 106 of FIG. 2.

FIG. 6 is a flow chart illustrating the steps of the method for automated testing of display signals, in accordance with one embodiment of the present invention. The process begins, step 230, by capturing display signals 232. As discussed with respect to FIG. 1, the printed circuit board 100 captures display signals 102. In the next step, 234, the display signals are converted into data acquisition signals 234. As illustrated in several noted embodiments with respect to FIGS. 3-5, the data acquisition signals 104 are generated by converting the display signals into an alternative format usable by the test computer.

Furthermore, the data acquisition signals are thereupon provided to a test system that tests the display signals, step 236. As discussed above with respect to FIG. 2, the test computer 106 receives the data acquisition signal 104 and thereupon performs tests based upon executable instruction 122 provided from the memory 116. As such, the display signals 102 provided from the computer under test 110 are acquired by the printed circuit board 100 and data acquisition signals 104 are generated to provide for the automatic testing of the display signals using the test computer 106, step 238.

FIG. 7 is a flowchart illustrating the steps of a method for the automatic testing of a display signal in accordance with another embodiment of the present invention. The process begins, step 240, by providing a test command to a computer under test such that the computer under test generates a display signal to be transmitted to a display device, including providing a command to a command converter and generating the test command. As discussed above with respect to FIG. 2, the command includes the commands 124 and 126 provided to command converter 130, more specifically to the keyboard converter 130 and the linear actuator 132, respectively. Moreover, the test command includes the key-stroke command 140 or the power command generated by the linear actuator tip 144 or any other power command generated by alternative embodiments of the linear actuator 132.

In the next step, 244, the display signals to be received by the display device are captured using a printed circuit board. As discussed above with respect to FIG. 2, the printed circuit board 100 receives the display signals 102. Thereupon, the display signals are converted into data acquisition signals, step 246, similar to the above step 234 of FIG. 7. The data acquisition signals are thereupon provided to a test system that tests the display signals, step 248. This step is similar to the above-step 236 with respect to the embodiment of FIG. 7.

In the next step, 250, taking measurements of the at least one data acquisition signal, including measuring the time between events on a horizontal synchronization signal, a vertical synchronization signal, a data enable signal, a pixel clock signal, a voltage control signal or a backlight control signal. As discussed above with respect to FIG. 2, the test computer 106 performs the tests using the processor 114 executing executable instructions 122 from the memory 116. The executable instructions may provide for different types of testing for a variety of results, based on a preferred examination of the original display signal 102 transmitted from the computer under test 110 to the display 112. Once the test has been completed, the test computer 106 may thereupon generate a display accuracy report, step 252. The display accuracy report is any type of report using any suitable formatting for delineating the measurement factors used to test the display signal 102. The display accuracy report may contain the signal measurements previously recorded by a technician detected using an oscilloscope. The display accuracy report may also contain computational results of the acquired data, wherein the processor 114 performs the computation of the data. Thereupon, the automatic testing the display signal 102 is completed, step 254.

Tests include, but are not limited to, taking time interval measurements of the display signals and comparing these measurements to upper and lower limits for these measurements as specified by the display manufacturer of the connected display. A test is deemed to "pass" if the measurement lies within the specified upper and lower limits for the measurement, and to "fail" if the measurement lies outside these limits. Examples of test measurements include, but are not limited to:

pixel clock frequency (the number of pixel clock cycles per second)

horizontal refresh rate (the number of horizontal synchronization pulses per second)

horizontal active time (the period of time for one line of pixel data to be displayed, equivalent to the pulse width of the data enable signal)

horizontal back porch (the period of time between the end of the horizontal synchronization pulse and the start of the next horizontal active time)

horizontal front porch (the period of time between the end of the horizontal active time and the start of the next horizontal synchronization pulse)

horizontal synchronization pulse width (the period of time that the horizontal synchronization pulse is active)

horizontal synchronization period (the period of time from the start of the horizontal synchronization pulse to the start of the next horizontal synchronization pulse)

vertical refresh rate (the number of vertical synchronization pulses per second)

vertical active time (the period of time for all lines of pixel data in a frame to be displayed)

vertical back porch (the period of time between the end of the vertical synchronization pulse and the start of the next vertical active time)

vertical front porch (the period of time between the end of the vertical active time and the start of the next vertical synchronization pulse)

vertical synchronization pulse width (the period of time that the vertical synchronization pulse is active)

vertical synchronization period (the period of time from the start of the vertical synchronization pulse to the start of the next vertical synchronization pulse)

vertical to horizontal synchronization phase (the period of time from the start of the vertical synchronization pulse to the start of the next horizontal synchronization pulse).

The present invention improves over the prior art by providing a method and apparatus for automating the testing of display signals, which not only improves the speed at which a video graphics system may be tested, but also provides for a higher degree of reliability based on the elimination of the possibility of human error. Moreover, the present invention provides for the generation and compilation of display testing information and the further advantage of allowing the conducting of various types of tests from the same data acquisition signal, which does not require regeneration of the display signal, retesting of the display signal using a measuring instrument, such as an oscilloscope.

It should be understood that there exists implementations of other variations and modifications of the invention and its various aspects, as may be readily apparent to those of ordinary skill in the art, and that the invention is not limited by the specific embodiments described herein. For example, printed circuit board 100 may be disposed between the computer under test 110 and the display 112 instead of having the display signal 102 extracted and then provided to the printed circuit board 100. It is therefore contemplated to cover by the present invention, any and all modifications, variations, or equivalents to fall within the spirit and scope of the basic underlying principles disclosed and claimed herein.

What is claimed is:

1. A method for automated testing of display signals from video graphics circuitry comprising:

capturing at least one display signal from the video graphics circuitry;

converting the at least one display signal into at least one data acquisition signal having a pixel clock signal; and providing the at least one data acquisition signal to a test system that is not part of said video graphics circuitry, wherein the test system tests the at least one display signal by taking time interval measurements of the at least one data acquisition signal, wherein at least one time interval measurement is based on the pixel clock signal.

2. The method of claim 1 wherein the at least one data acquisition signal includes at least one of the following: a vertical synchronization signal, a horizontal synchronization signal, a data enable signal and a voltage control signal.

3. The method of claim 1 wherein the display signals are also transmitted to the display device.

4. The method of claim 3 wherein the display signals are transmitted to the display device using at least one of low voltage differential signaling, transition minimized differential signaling, and analog RGB signaling.

5. The method of claim 1, wherein the display signals are generated by a computer under test and prior to capturing the display signals, the method further comprising:

providing at least one of the following: a keyboard command and a power change command, to the computer under test from a test computer to generate the display signals.

6. A method for automated testing of display signals from video graphics circuitry comprising:

capturing at least one display signal;

converting the display signal into at least one data acquisition signal; and providing the at least one data acquisition signal to a test system that tests the display signal, wherein the display signals are transmitted to the display device using at least one of low voltage differential signaling and transition minimized differential signaling.

7. A method for automated testing of display information for a display device comprising:

providing a test command to a computer under test such that the computer under test generates display signals to be transmitted to the display device:

capturing at least one display signal from the computer under test;

converting the at least one display signal into at least one data acquisition signal having a pixel clock signal;

providing the at east one data acquisition signal from the computer under test to a test system that is not part of the computer under test; and using the test system to take time interval measurements of the at least one data acquisition signal, wherein at least one time interval measurement is based on the pixel clock signal.

8. The method of claim 7 wherein prior to providing the test command to the computer, the method includes:

providing an original command to a command converter; and generating the test command.

9. The method of claim 7 further comprising generating a display accuracy report.

10. The method of claim 7 wherein taking time interval measurements of the at least one data acquisition signal includes measuring at least one of the following: a horizontal synchronization signal, a vertical synchronization signal, a data enable signal, a voltage command signal and a backlight signal.

11. The method of claim 7 wherein the display signal is at least one of the following: a low voltage differential signal, a transition minimized differential signal and an analog RGB signal.

12. An apparatus for automated testing of display signals from video graphics circuitry comprising:

a printed circuit board capable of receiving the display signals from the video graphics circuitry, wherein the printed circuit board comprises at least a display signal transmission receiver operable to generate, from the display signals, a data acquisition signal including at least a pixel clock signal; and a test computer configured to receive the data acquisition signal from the printed circuit board and to take time interval measurements of the data acquisition signal, wherein at least one time interval measurement is based on the pixel clock signal.

13. The apparatus of claim 12 further comprising:

a command generated by the test computer; and a command converter coupled to the test computer and a computer under test such that the command converter receives the command from the test computer, generates a test command and provides the test command to the computer under test.

14. The apparatus of claim 13 wherein the command converter generates at least one of the following: a keystroke command and a power change command.

15. An apparatus for automated testing of display signals from video graphics circuitry comprising:

a printed circuit board capable of receiving display signals, wherein the printed circuit board comprises at least a display signal transmission receiver operable to generate, from the display signals, a data acquisition signal including at least a pixel clock signal; and a test computer configured to receive the data acquisition signal from the printed circuit board and to test the display signals, wherein the printed circuit board includes:

at least one line buffer; and a low voltage differential signaling receiver coupled to the at least one buffer such that low voltage different signaling receiver generates the data acquisition signals that include at least one of the following: a vertical synchronization signal, a horizontal synchronization, a data enable signal and a pixel clock signal.

16. An apparatus for automated testing of display signals from video graphics circuitry comprising:

a printed circuit board capable of receiving display signals, wherein the printed circuit board comprises at least a display transmission receiver operable to generate, from the display signals, a data acquisition signal including at least a pixel clock signal; and a test computer configured to receive the data acquisition signal from the printed circuit board and to test the display signal wherein the printed circuit board includes:

a transition minimized differential signaling bus;

a transition minimized differential signaling receiver coupled to the transition minimized differential signaling bus;

a transition minimized differential signaling transmitter coupled to the transition minimized differential signaling receiver across a signal bus; and a plurality of buffers coupled to the signal bus for receiving at least one of the following signals being provided to the transition minimized differential signaling transmitter: a vertical synchronization signal, a horizontal synchronization, a data enable signal and a pixel clock signal.

17. An apparatus for automated testing of display signals from video graphics circuitry comprising:

a printed circuit board capable of receiving display signals from the video graphics circuitry, wherein the printed circuit board comprises at least a display signal transmission receiver operable to generate, from the display signals, a data acquisition signal including at least a pixel clock signal; and a test computer operably coupled to the printed circuit board, the test computer including a processor operably coupled to a memory storing executable instructions such that the processor, in response to the executable instructions:

generates a command to be provided to a computer under test;

receives the data acquisition signal; and takes time interval measurements of the data acquisition signal, wherein at least one time interval measurement is based on the pixel clock signal.

18. The apparatus of claim 17 further comprising:

a command converter operably coupled to the test computer, such that the command converter receives the command from the test computer and generates a test command to be provided to a computer under test.

* * * * *